United States Patent [19]

Rhee et al.

[11] Patent Number: 5,500,474
[45] Date of Patent: Mar. 19, 1996

[54] STABLE CONDUCTING POLYMER AND PROCESSES FOR THE PREPARATION THEREOF

[75] Inventors: Suh B. Rhee; Myong-Hoon Lee, both of Doryong-Dong; Chang-Jin Lee, Doma-Dong; Bong S. Moon, Yongsan-Gu, all of Rep. of Korea

[73] Assignee: Korea Research Institute of Chemical Technology, Daejun, Rep. of Korea

[21] Appl. No.: 498,858

[22] Filed: Jul. 6, 1995

Related U.S. Application Data

[62] Division of Ser. No. 162,620, Dec. 7, 1993.

[30] Foreign Application Priority Data

Dec. 10, 1992 [KR] Rep. of Korea ............... 92-23786

[51] Int. Cl.⁶ .................................................... C08K 5/16
[52] U.S. Cl. ................. 524/714; 528/373; 528/381; 528/388; 528/391; 528/422; 524/700; 524/722; 524/726; 524/729
[58] Field of Search ............................ 528/373, 381, 528/388, 391, 422; 524/700, 714, 722, 726, 729

[56] References Cited

PUBLICATIONS

Diaz, A. F., et al., Mechanical Properties of Electrochemically Prepared Polypyrrole Films, Jul. 1983, IBM J. Res. Develop., vol. 27, No. 4, pp. 342–347.

De Paoli, Marco–A., et al., An Electrically Conductive Plastic Composite Derived from Polypyrrole and Poly(vinyl Chloride), 1985, Jour. Polym. Science, Polym. Chem. Ed., vol. 23, pp. 1687–1698.

Hotta, S. et al., Spectroscopic Studies of Soluble Poly(3–alkylthienylenes), 1987, Macromolecules, vol. 20, No. 1, pp. 212–215.

Iyoda, Tomokazu, et al., Charge–Controllable Membrane, Polypyrrole–Polyelectrolyte Composite Membrane Through Anodic Doping Process, 1986, Chem. Soc. of Japan, Chemistry Letters, pp. 687–690.

*Primary Examiner*—Samuel A. Acquah
*Attorney, Agent, or Firm*—Birch, Stewart, Kolasch & Birch

[57] ABSTRACT

Conductive polymers having repeating units of formula (II)

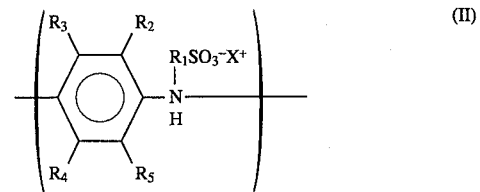

formed by chemical or electrochemical oxidation of aniline derivatives of formula (I)

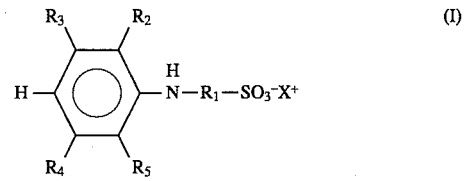

wherein $R_1$ denotes $-(CH_2)_n-$; n is an integer between 2 and 12; $R_2$, $R_3$, $R_4$ and $R_5$ denote hydrogens or one or two of them can be a halogen atom, methyl, methoxy or nitro groups; and X denotes hydrogen an alkali metal ion, an ammonium ion, an alkyl ammonium ion or an anilinium ion. The conductive polymers have excellent stability toward electrochemical redox cyclization and good processibility.

13 Claims, 1 Drawing Sheet

STABLE CONDUCTING POLYMER AND PROCESSES FOR THE PREPARATION THEREOF

This application is a divisional of copending application Ser. No. 08/162,620, filed on Dec. 7, 1993, the entire contents of which are hereby incorporated by reference.

BACKGROUND OF THE INVENTION

1. Field of the Invention

The present invention relates to new aniline derivatives, a process for the preparation thereof, new conducting polymers using them as monomers and processes for the preparation thereof for use in battery electrodes, electrochromic device materials, sensors and the like due to their excellent stability and outstanding electrochemical and electrochromic properties.

2. Description of the Prior Art

A number of conducting polymers are known in the art including polyacetylenes, polypyrroles, polythiophenes and polyanilines. In spite of their many good characteristics such as light weight, practically high conductivity, semiconductor properties, electrochromic properties and redox cyclability, the conductive polymers have rarely been commercialized due to drawbacks such as poor processibility, low redox cyclability and weak mechanical properties.

In order to find solutions to the above problems, a number of methods are disclosed as described in the following.

Firstly, there is a process for improving mechanical strength of conducting polymers by using p-toluene sulfonate as a dopant for an electrochemical preparation of polypyrrole instead of using conventional inorganic dopants such as lithium perchlorate and tetraethylammonium bromide (IBM J. Res. Rev., 1983, 27, 342). However, it was found that p-toluene sulfonate dopant dissolves out into the solution during the repetitive redox cycling of the conducting polymer in electrolytic solution.

Another example (Chem. Lett., 1986, 687) is using poly-(styrene sulfonate) instead of p-toluene sulfonate as a dopant to prevent the dissolution problem, where the concentration of electroactive center in the conductive material is diluted resulting in lowering energy density of the rechargeable battery when used as an electrode.

Secondly, to improve mechanical strength of conducting polymers, a composite of conducting polymers was made with conventional polymers such as polyvinylchloride or polystyrene (J. Polym. Sci., Polym. Commun., 1985, 23, 1687). However, there still exists a need to improve the coulombic charge density because the concentration of electroactive center in the composite is diluted by the polymer used.

Thirdly, a method using an alkyl side-chain derivative of thiophene as a monomer is disclosed (Macromol., 1987, 20, 212). For instance, 3-octylthiophene is polymerized to produce poly(3-octylthiophene) that is not only fusible but also soluble in organic solvents such as chloroform. However, expensive monomer price and low redox cyclability prevent the commercial utilization of the polymer.

Another method is to introduce a sulfonyl group in the monomer structure as in the case of poly(3-(3'-thienyl)-1-propanesulfonic acid) which can be used as an intramolecular dopant, where fast redox kinetics and a good processibility are achieved. However, there still is a problem such that the monomer preparation needs several synthetic steps.

As shown in above examples, various problems such as the method of monomer preparation, processibility and the redox stability of the polymer should be solved to widen the application area of the conducting polymers.

SUMMARY OF THE INVENTION

Thus the inventors of this invention have studied these problems for a long time and finally developed new monomers and their polymers in which an alkyl sulfonate group is introduced on the nitrogen atom of aniline, where the conducting polymers thus-prepared show various advantages. The preparation of the monomer is relatively easy and the electrochemical kinetics of the redox reaction is fast since the alkyl sulfonate moiety in the polymer acts as an intramolecular dopant.

Moreover, the polymer shows excellent stability toward electrochemical redox cyclization and it is soluble in polar solvents like water and dimethylformamide so as to having good processibility.

Therefore, this invention provides a method for preparation of new aromatic amine derivatives as a monomer wherein an alkyl sulfonate moiety is introduced on the nitrogen atom of an aromatic amine and a method for preparation of new conducting polymers by oxidatively polymerizing the monomer chemically or electrochemically so that the resulting conductive polymer has excellent stability towards electrochemical redox cyclization and good processibility.

Other objects and further scope of applicability of the present invention will become more apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DESCRIPTION OF THE PREFERRED EMBODIMENTS

Figure 1:
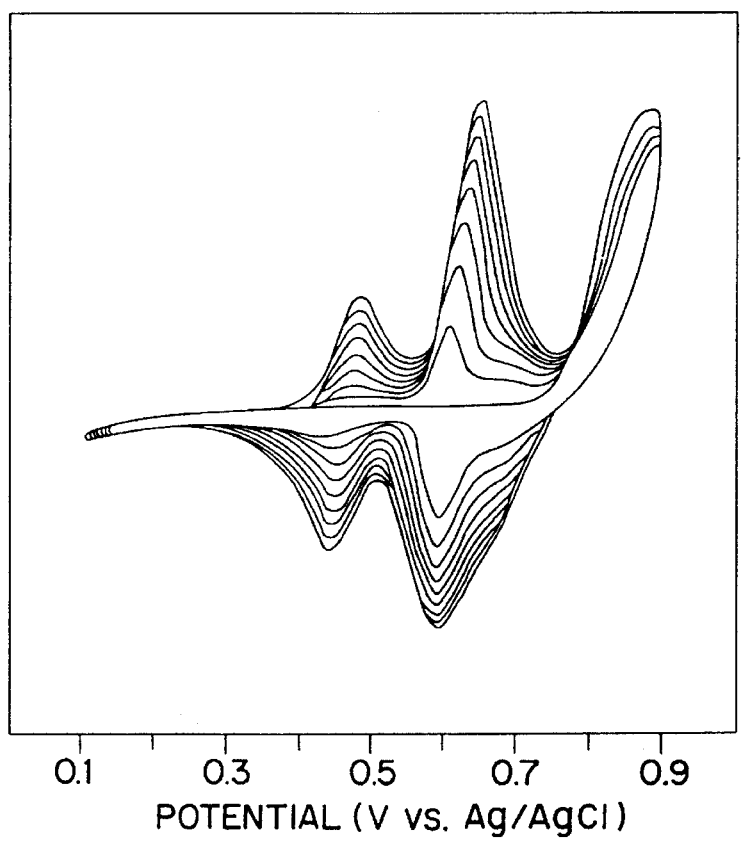
FIG. 1 shows the current response of the cyclic potential scans for the electrochemical polymerization of 4-(2-methoxyanilino)-1-butanesulfonic acid.

Referring now to the present invention, there is provided new conductive polymers which have excellent stability toward electrochemical redox cyclization and good processibility.

The present invention is directed to the new monomer compounds described as formula (I), and their methods of preparation. This invention also provides new conducting polymers having repeating units described as formula (II)

and methods of preparation thereof from the above monomers by chemical and/or electrochemical oxidation.

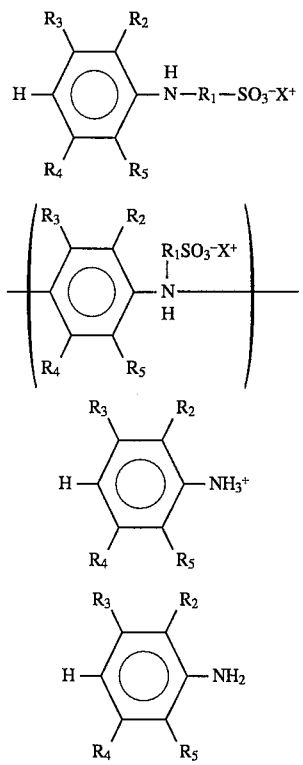

In the above formulae, $R_1$ denotes $—(CH_2)_n—$, where n is an integer between 2 and 12 and $R_2$, $R_3$, $R_4$ and $R_5$ denote hydrogens, one or two of which can be a halogen atom (including fluorine, chlorine, bromine and iodine) or methyl, methoxy and nitro groups; X denotes hydrogen, an alkali metal ion such as sodium, lithium and potassium, an alkyl ammonium ion such as ammonium, tetramethyl ammonium and tetrabutyl ammonium, or an ammonium ion of aniline derivatives in formula (III).

GENERAL MONOMER PREPARATION EXAMPLES

Aniline derivatives described as in formula (I) are prepared by the following methods:

MONOMER PREPARATION EXAMPLE I

An ω-bromoalkylsulfonate sodium salt is formed by reacting α,ω-dibromoalkane with ⅓ to ½ mole of sodium sulfite in one or a mixture of solvents such as ethanol, methanol, dimethylacetamide, water and the like, at the temperature range between room temperature and the boiling temperature of the solvent.

The ω-bromoalkylsulfonate sodium salts thus-prepared are reacted with aromatic amines of formula (IV) in the presence of or without basic catalysts such as sodium carbonate, sodium bicarbonate, pyridine and alkyl amine to produce sodium salts of aniline derivatives at the temperature range between room temperature and the boiling temperature of the solvent. One or mixed solvents of ethanol, methanol, tetrahydrofuran, dimethylformamide and water or an excess amount of aromatic amine is used as a solvent.

Sodium ω-anilino-1-alkanesulfonates, thus-prepared, are reacted with an acidic solution of hydrochloric acid, sulfuric acid or perchloric acid to produce ω-anilino-1-alkanesulfonic acids, which are then neutralized with an aqueous basic solution such as potassium hydroxide, sodium hydroxide, lithium hydroxide, ammonium hydroxide, tetramethylammonium hydroxide, tetraethylammonium hydroxide, tetrabutylammonium hydroxide or an aromatic amine described as in formula (IV) to produce aniline derivatives described as in formula (I).

MONOMER PREPARATION EXAMPLE II

Aniline derivatives wherein $R_1$ is $—(CH_2)_3—$ or $—(CH_2)_4—$ described in formula (I) are prepared from aromatic amines as in formula (IV) by reacting them with propane sultone or butane sultone in the presence of organic solvents such as ethanol, methanol, tetrahydrofuran and chloroform or in the presence of excess aromatic amine at a temperature range of between ambient temperature and the boiling point of the solvent.

Then, the aromatic amine salts of ω-anilino-1-alkanesulfonate are treated with aqueous acid to produce ω-anilino-1-alkanesulfonic acids.

Thus-prepared ω-anilino-1-alkanesulfonic acids are neutralized with aqueous bases such as potassium hydroxide, ammonium hydroxide, tetraalkylammonium hydroxide or aromatic amines described as in formula (IV) to produce aniline derivatives described as in formula (I), where n in $R_1$ denotes 3 or 4.

MONOMER PREPARATION EXAMPLE III

An ω-bromoalkanol is reacted with tosyl chloride to produce ω-bromoalkanol tosylate by using an excess amount of pyridine or in the presence of a catalytic amount of pyridine or a trialkyl amine in organic solvents such as tetrahydrofuran, chloroform or dichloromethane at temperatures between −20° C. and ambient temperature.

The thus-prepared ω-bromoalkanol tosylate is reacted with aromatic amines to produce N-(ω-bromoalkyl)aniline in inert organic solvents such as 1,4-dioxane, tetrahydrofuran, chloroform and dichloromethane or in excess aromatic amine at temperatures between 0° C. and the boiling point of the solvent. Organic bases such as pyridine can be used as a catalyst when the reaction is done in organic solvents.

The thus-prepared N-(ω-bromoalkyl)aniline is reacted with 1.1 to 4 equivalents of sodium sulfite to produce ω-anilino-1-alkanesulfonate sodium salt in one or mixed solvents of ethanol, methanol, dimethylacetamide, water and the like.

The ω-anilino-1-alkanesulfonate sodium salt is acidified with an aqueous acidic solution of hydrochloric acid, sulfuric acid or perchloric acid and then neutralized with aqueous bases such as sodium hydroxide, potassium hydroxide, lithium hydroxide, ammonium hydroxide and tetraalkylammonium hydroxide or with aromatic amines described as in formula (IV) to produce aniline derivatives described as in formula (I).

Additionally, aromatic amine derivatives of formula (I) can also be prepared by using ω-chloroalkanol instead of ω-bromoalkanol in the reaction described above. When ω-chloroalkanol is used as a starting material, the reaction of N-(ω-chloroalkyl)aniline with sodium sulfite is performed in a pressure reactor at 2 to 30 atm.

The ω-anilino-1-alkanesulfonate derivatives, thus-prepared, are polymerized by chemical or electrochemical oxidation to produce conducting polymeric materials and the processes for preparing them are as follows.

POLYMER SYNTHESIS

In the case of chemical polymerization, firstly, a chemical oxidant such as ferric chloride is dissolved in organic solvents including chloroform, tetrahydrofuran and acetone or in water and then ω-anilino-1-alkanesulfonate is added and polymerized by chemical oxidation. When ammonium persulfate is used as an oxidant the solvent is preferably an aqueous solution of hydrochloric acid or sulfuric acid, whilst it can be one of or a mixed solvent of water, chloroform, dichloromethane and tetrahydrofuran when ferric chloride is used.

As a result, a conductive high polymer of formula (II) is obtained, which is acidified with an aqueous hydrochloric acid, sulfuric acid or perchloric acid, dialyzed repeatedly and neutralized with an aqueous basic solution of sodium hydroxide, potassium hydroxide, lithium hydroxide, ammonium hydroxide, tetraalkylammonium hydroxide or aromatic amines of formula (IV).

Furthermore, conductive copolymers can be obtained from chemical polymerization of two or more ω-anilino-1-alkanesulfonates chosen from two or more monomers in formula (I) or one from formula (I) and one or more from aromatic amines in formula (IV).

When the aromatic amines of formula (IV) are used in the above copolymerization, they can be used directly or in the form of their sulfate or perchlorate salts in the ratio of 0.01 to 100 mole for 1 mole of ω-anilino-1-alkanesulfonate (formula (I)) used. Copolymers from more than 5 mol equivalents of aromatic amines (formula (IV)) are not soluble in water and hence their purification is accomplished by washing the resulting precipitates with water and methanol repetitively rather than by dialysis.

As an electrochemical method, ω-anilino-1-alkanesulfonate is polymerized by electrolytic polymerization in a solution containing proper electrolytes. The solvent can be one or mixed solvents of acetonitrile, nitrobenzene, propylene carbonate and water. The electrolytes may be ω-anilino-1-alkanesulfonate itself and/or alkylammonium or alkali metal salts of organic or inorganic acid anions such as $F^-$, $Cl^-$, $Br^-$, $I^-$, $ClO_4^-$, $IO_4^-$, $NO_3^-$, $BF_4^-$, $AsF_5^-$, $PF_6^-$, $HSO_4^-$, $SO_3^{-2}$, $CF_3COO^-$, $CF_3SO_2^-$, benzene sulfonate and methane sulfonate.

The electrochemical polymerization proceeds by applying electrical energy such as currents and/or potentials on the working electrode by using 3 different methods that are discussed in more detail as follows.

Firstly, the electrochemical polymerization is performed by applying a constant potential on the working electrode, the so-called "potentiostatic method". A conductive high polymer film is obtained on the working electrode when applying a constant potential of 0.5 to 3.0 V between the working and reference (Ag/AgCl) electrodes.

Secondly, the so-called "galvanostatic method" can also be used to produce a conductive high polymer film on the working electrode. In this case, the reference electrode is not used and the current applied on the working electrode is maintained constant in the range of 0.01 $mA/cm^2$ to 1 $A/cm^2$.

Thirdly, the so-called "cyclovoltammetric method" can be used for the electrolytic polymerization of ω-anilino-1-alkanesulfonates. The potential of the working electrode is cycled between two limiting potentials chosen from the range of −0.7 to 2.0 V with a scan rate of 10 to 200 mV/sec.

Conductive high polymers thus prepared from the electrochemical methods described above are all soluble in water and can be cast on a substrate including ITO glass or stainless steel plate.

Conductivities differ depending on the preparation conditions and monomer structures. Generally the conductive polymer films, thus-prepared, show a conductivity range of 0.05 to 50 S/cm by a 4-probe conductivity measurement.

Conductive copolymers can also be prepared from ω-anilino-1-alkanesulfonate of formula (I) and 0.01 to 100 mole equivalents of aromatic amines of formula (IV). The solubility of copolymer in water differs depending upon the amount of aromatic amines used as in the chemical copolymerization and the copolymers from 5 mol equivalent aromatic amines are not soluble in water.

FIG. 1 shows the current response of the cyclic potential scans for the electrochemical polymerization of 4-(2-methoxyanilino)-1-butanesulfonic acid. As the cycling is continued, new oxidation current peaks of conductive polymer are increased at 0.42 and 0.58 V.

Figure 2:
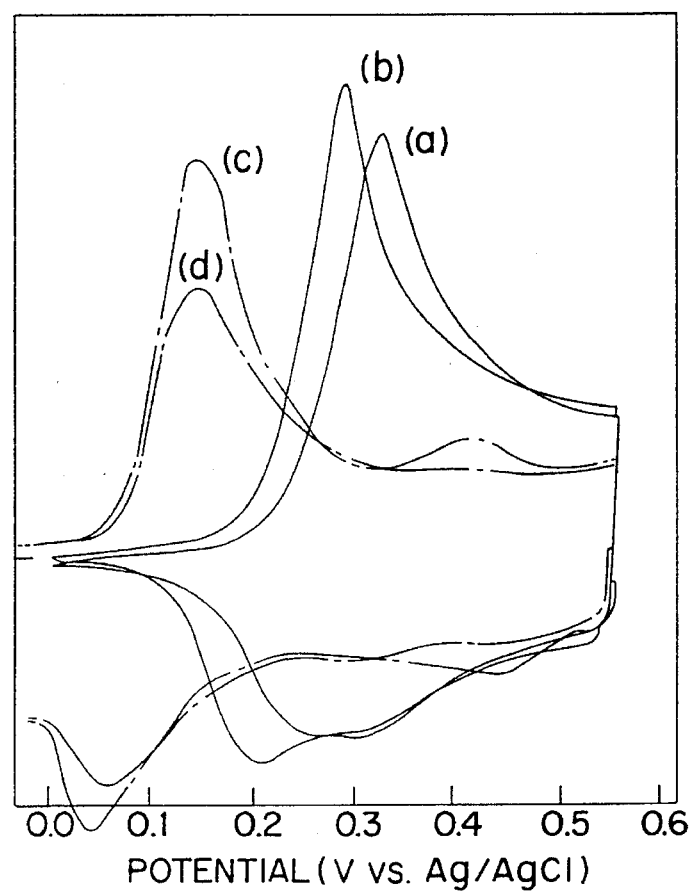
FIG. 2 shows (a) the initial and (b) the 40,000th cycle's cyclic voltammograms of poly(4-anilino-1-butanesulfonic acid) produced by an example according to the present invention compared with (c) the initial and (d) the 4,000th cycle's cyclic voltammograms of polyaniline.

FIG. 2 shows (a) the initial and (b) the 40,000th cycle's cyclic voltammograms of poly(4-anilino-1-butanesulfonic acid) prepared by the galvanostatic polymerization method compared with (c) the initial and (d) 4,000th cycle's cyclic voltammograms of polyaniline.

As shown in FIG. 2, the conductive polymer of our invention shows almost no difference in current response for the cyclic potential even after 40,000 cycles while in the case of polyaniline the decrease of current response is observed after only 4,000 cycles. Therefore, it is obvious that the conductive polymer of our invention is much more stable than polyaniline, which is known as one of the most redox-stable conducting polymers.

Conductive polymers of our invention contain an alkyl sulfonate moiety that can be used as an internal dopant so that the polymer can be doped by itself without assistance of external acids or other electrolytes for the redox reaction. Therefore the redox kinetics could be accelerated to make the conductive polymer more stable.

Furthermore, while polyaniline usually needs a strong acidic medium, the conductive polymers of our invention can show fast redox reactions in weak acidic solution or even in neutral solution, which is very desirable when the polymer is to be subjected to practical applications such as electrochromic display devices, considering that transparent electrode material such as ITO glass tend to corrode in strong acidic medium.

Furthermore, the chemically prepared polymers as well as the electrochemically prepared ones are soluble in water so that they can be processed as thin films or any other shapes. Therefore they are useful for storage batteries, electrochromic display devices or other semiconductor articles, as a desirable material, in any field using conductive high polymer materials wherein electric, electrochromic properties and long cyclability is required.

The following examples and preparations describe the manner and process of making and using the invention and set forth the best mode contemplated by the inventors of carrying out the invention, but are not to be construed as limiting.

EXAMPLE 1

5-Anilino-1-pentanesulfonic acid sodium salt: To a solution of 1,5-dibromopentane (50 g, 0.22 mol) in ethanol-water (ethanol, 200 mL; water, 50 mL), is added sodium bisulfate solution (9.5 g, 0.075 mol) in water (100 mL)

dropwisely during 2 hr. with heating. After the addition is completed, the reaction mixture is heated under reflux for 4 hr. and then cooled to room temperature.

The reaction mixture is concentrated under reduced pressure, and 200 mL of water is added.

The mixture is washed with ether and the aqueous layer is concentrated to give white solids. The solids are dissolved in ethanol with heating, and cooled slowly to room temperature to precipitate sodium bromide. The precipitates are filtered off and the filtrate is put in a refrigerator overnight to obtain 5-bromo-t-pentanesulfonic acid sodium salt (12.9 g, 68%) as white crystals. A solution of 5-bromo-1-pentanesulfonic acid sodium salt (12.9 g, 0.05 mol) and aniline (20 g, 0.22 mol) in water (150 mL) is heated under reflux with potassium bicarbonate (6.3 g, 0.075 mol) for 8 hr. After the reaction is completed, the reaction mixture is washed with ether and the aqueous layer is concentrated to give white solids. The solid is recrystallized in methanol to obtain 5-anilino-1-pentanesulfonic acid sodium salt (10.6 g, 80%) as white crystals.

Calcd. for $C_{11}H_{16}NO_3SNa$, C:49.81, H:6.04, N:5.28, S:12.08 Found C:49.96, H:6.32, N:5.38, S:11.994

EXAMPLE 2

4-Anilino-butanesulfonic acid sodium salt: A solution of butanesultone (27.2 g, 0.2 mol) and aniline (46.5 g, 0.5 mol) in ethanol is heated under reflux for 4 hr. and cooled to room temperature to precipitate a white solid. The precipitates are filtered and recrystallized in ethanol to obtain 4-anilino-1-butanesulfonic acid (42.2 g, 90%) as white crystals. 4-Anilino-1-butanesulfonic acid (10 g) is dissolved in water and neutralized by sodium hydroxide. The neutral solution is concentrated under reduced pressure to give white solids. The solids are crystallized in methanol-chloroform to obtain 4-anilino-1-butanesulfonic acid sodium salt (10.0 g, 92%) as white crystals.

Calcd. for $C_{10}H_{14}NO_3SNa$, C:47.80, H:5.62, N:5.57, S:12.76 Found C:47.53, H:5.43, N:56.86, S:12.80

EXAMPLE 3

6-Anilino-1-hexanesulfonic acid sodium salt: To a solution of 6-bromohexanol (15 g, 0.083 mol) and pyridine (50 mL) is added p-toluenesulfonyl chloride (17.4 g) during 30 min. at 0° C., and the mixture is stirred for 4 hr. at that temperature.

Aqueous 1N HCl solution (300 mL) is added to the mixture and the organic layer is extracted with ether.

The ethereal layer is washed with water, dried over magnesium sulfate, and concentrated to give 6-bromohexanol rosylate (25.3 g, 95%) as a white solid. A solution of 6-bromohexanol tosylate (25.3 g, 0.079 mol) and aniline (20 g) in tetrahydrofuran (120 mL) is heated under reflux for 8 hr.

After the reaction is completed, the reaction mixture is cooled to room temperature. 200 mL of water is added to the mixture and the organic layer is extracted with ether. The ethereal layer is washed with water, dried over magnesium sulfate, and concentrated under reduced pressure to give bromohexyl)aniline (16.0 g, 83%) as a gray solid. The solid of N-(6-bromohexyl)aniline (16.0 g, 0.066 mol) is dissolved in ethanol-water (ethanol, 150 g; water, 100 g), sodium bisulfite (16.66 g, 0.13 mol) is added to the mixture, and then the reaction mixture is heated under reflux overnight.

After cooling to room temperature, the reaction mixture is filtered, and the filtrate is concentrated to give white solids. The solids are recrystallized in methanol to obtain 6-anilino-1-hexanesulfonic acid sodium salt (11.2 g, 61%) as white crystals.

Calcd. for $C_{12}H_{18}NO_2SNa$, C:51.60, H:6.50, N:5.0t, S:11.48 Found C:51.51, H:6.49, N:5.17, S:11.39

EXAMPLE 4

8-Anilino-1-octanesulfonic acid sodium salt: To a solution of 8-chlorooctanol (16.5 g, 0.1 mol) and pyridine (70 mL) is added p-toluenesulfonyl chloride (20.9 g, 0.11 mol) during 30 min. at 0° C., and the mixture is stirred for 4 hr. at that temperature. Aqueous 1N HCl solution (500 mL) is added to the mixture and the organic layer is extracted with ether.

The ethereal layer is washed with water, dried over magnesium sulfate, and concentrated under reduced pressure to give 8-chlorooctanol tosylate (29.3 g, 92%) as a white solid. The solution of 8-chlorooctanol tosylate (12.0 g, 0.038 mol) and aniline (50 g) in tetrahydrofuran (140 g) is heated under reflux for 8 hr.

After the reaction is completed, the reaction mixture is cooled to room temperature. 200 mL of water is added to the mixture and the organic layer is extracted with ether.

The ethereal layer is washed with water, dried over magnesium sulfate, and concentrated under reduced pressure to give N-(8-chlorooctyl)aniline (7.1 g, 75%) as a white solid.

In a 50 mL pressure vessel are placed N-(8-chlorooctyl)aniline (7.1 g, 0.03 mol) and sodium sulfite (7.5 g, 0.06 mol) dissolved in water (150 g) and ethanol (200 g). The reaction mixture is refluxed under 7 arm for 7 hr.

After cooling to room temperature, the reaction mixture is filtered, and the filtrate is concentrated to give white solids. The solids are recrystallized in methanol to afford 8-anilino-1-octanesulfonic acid sodium salt (4.9 g, 53%) as white crystals.

Calcd. for $C_{14}H_{22}NO_2SNa$, C:51.74, H:7.16, N:4.56, S:10.44 Found C:55.00, H:7.00, N:4.55, S:10.18

A number of ω-anilino-1-alkanesulfonates are synthesized by the one or two methods among 4 examples explained above. The representative examples and the data from the elemental analyses are listed in Table 1.

In Table 1, n is the number of methylenes in ω-anilino-1-alkanesulfonate sodium salt. The numbers in the method column are the example numbers that are applied for the syntheses, and the number in parenthesis indicates the method of sample preparation for elemental analyses.

TABLE 1

| Example | $R_2$ | $R_4$ | n | C | H | N | S | Method |
|---|---|---|---|---|---|---|---|---|
| | | | Examples 5 to 169 | | | | | |
| 5 | H | H | 2 | 42.86 | 4.42 | 6.46 | 14.31 | (1) |
| 6 | H | F | 2 | 39.85 | 3.80 | 5.59 | 13.36 | (1) |
| 7 | F | H | 2 | 39.85 | 3.74 | 6.07 | 13.43 | (1) |
| 8 | Cl | H | 2 | 37.38 | 3.76 | 5.29 | 12.54 | (1) |
| 9 | H | Cl | 2 | 37.28 | 3.59 | 5.67 | 12.67 | (1) |
| 10 | Br | H | 2 | 31.86 | 2.78 | 4.75 | 10.42 | (1) |
| 11 | H | Br | 2 | 31.62 | 3.03 | 4.70 | 10.55 | (1) |
| 12 | I | H | 2 | 27.32 | 2.54 | 4.17 | 9.16 | (1) |
| 13 | H | I | 2 | 27.38 | 2.54 | 4.28 | 9.45 | (1) |

TABLE 1-continued

Examples 5 to 169

| Example | R₂ | R₄ | n | C | H | N | S | Method |
|---|---|---|---|---|---|---|---|---|
| 14 | CH₃ | H | 2 | 40.60 | 5.22 | 5.76 | 13.67 | (1) |
| 15 | H | CH₃ | 2 | 40.27 | 5.07 | 6.16 | 13.40 | (1) |
| 16 | OCH₃ | H | 2 | 37.78 | 4.76 | 5.73 | 12.84 | (1) |
| 17 | H | OCH₃ | 2 | 38.01 | 4.93 | 5.49 | 12.37 | (1) |
| 18 | NO₂ | H | 2 | 35.96 | 3.09 | 10.25 | 11.70 | (1) |
| 19 | H | NO₂ | 2 | 35.93 | 3.10 | 10.44 | 12.18 | (1) |
| 20 | H | H | 3 | 45.29 | 4.91 | 5.88 | 13.24 | (2),1 |
| 21 | H | F | 3 | 42.21 | 4.22 | 5.71 | 12.48 | (2),1 |
| 22 | F | H | 3 | 42.27 | 4.23 | 5.65 | 12.62 | (2),1 |
| 23 | Cl | H | 3 | 39.79 | 4.23 | 4.92 | 11.99 | (2),1 |
| 24 | H | Cl | 3 | 39.86 | 3.94 | 5.17 | 11.81 | (2),1 |
| 25 | Br | H | 3 | 34.03 | 3.37 | 4.64 | 10.04 | (2),1 |
| 26 | H | Br | 3 | 34.17 | 3.69 | 4.65 | 10.24 | (2),1 |
| 27 | I | H | 3 | 29.81 | 3.25 | 3.97 | 8.76 | (2),1 |
| 28 | H | I | 3 | 29.58 | 2.95 | 3.91 | 8.89 | (2),1 |
| 29 | CH₃ | H | 3 | 43.28 | 5.90 | 5.60 | 12.48 | (2) |
| 30 | H | CH₃ | 3 | 42.75 | 5.55 | 5.79 | 12.90 | (2) |
| 31 | OCH₃ | H | 3 | 40.54 | 5.51 | 5.09 | 12.27 | (2) |
| 32 | H | OCH₃ | 3 | 40.60 | 5.24 | 5.00 | 12.11 | (2) |
| 33 | NO₂ | H | 3 | 38.24 | 4.14 | 9.63 | 11.61 | (2) |
| 34 | H | NO₂ | 3 | 38.26 | 4.20 | 9.87 | 11.54 | (2) |
| 35 | H | H | 4 | 47.53 | 5.43 | 5.86 | 12.80 | 1,(2),4 |
| 36 | H | F | 4 | 44.71 | 5.00 | 5.08 | 12.08 | (2),4 |
| 37 | F | H | 4 | 44.84 | 5.06 | 5.08 | 11.66 | (2),4 |
| 38 | Cl | H | 4 | 41.74 | 4.43 | 4.97 | 11.12 | (2),4 |
| 39 | H | Cl | 4 | 41.82 | 4.46 | 4.93 | 11.25 | 1,(2) |
| 40 | Br | H | 4 | 36.23 | 3.90 | 4.52 | 9.68 | (2) |
| 41 | H | Br | 4 | 36.35 | 4.15 | 4.46 | 9.81 | (2) |
| 42 | I | H | 4 | 31.61 | 3.38 | 3.84 | 8.44 | (2) |
| 43 | H | I | 4 | 31.68 | 3.39 | 3.48 | 8.27 | 1,(2) |
| 44 | CH₃ | H | 4 | 45.47 | 6.30 | 5.24 | 12.34 | (2) |
| 45 | H | CH₃ | 4 | 45.56 | 5.97 | 5.45 | 11.89 | (2) |
| 46 | OCH₃ | H | 4 | 42.45 | 5.63 | 5.15 | 11.38 | (2),4 |
| 47 | H | OCH₃ | 4 | 42.57 | 5.69 | 4.73 | 11.51 | (2),4 |
| 48 | NO₂ | H | 4 | 40.80 | 4.35 | 9.48 | 10.78 | (2) |
| 49 | H | NO₂ | 4 | 40.26 | 4.35 | 9.67 | 10.72 | (2) |
| 50 | H | H | 5 | 49.96 | 6.32 | 5.38 | 11.94 | (1),3,4 |
| 51 | H | F | 5 | 46.56 | 5.28 | 5.23 | 11.30 | 1,(4) |
| 52 | F | H | 5 | 46.64 | 5.31 | 5.20 | 10.53 | 1,(4) |
| 53 | Cl | H | 5 | 44.15 | 5.27 | 4.51 | 11.45 | 1,(4) |
| 54 | H | Cl | 5 | 44.27 | 5.32 | 4.51 | 10.53 | 1,(4) |
| 55 | Br | H | 5 | 38.65 | 4.40 | 3.82 | 9.36 | 1,(4) |
| 56 | H | Br | 5 | 38.43 | 4.65 | 4.36 | 9.49 | 1,(4) |
| 57 | I | H | 5 | 33.94 | 3.58 | 3.52 | 7.95 | 1,(4) |
| 58 | H | I | 5 | 34.01 | 3.59 | 3.48 | 8.09 | 1,(4) |
| 59 | CH₃ | H | 5 | 47.03 | 6.24 | 5.10 | 11.26 | 1,(4) |
| 60 | H | CH₃ | 5 | 47.15 | 6.55 | 4.75 | 11.45 | 1,(4) |
| 61 | OCH₃ | H | 5 | 44.66 | 6.21 | 5.02 | 10.67 | (1) |
| 62 | H | OCH₃ | 5 | 44.44 | 5.93 | 4.93 | 10.80 | (1),4 |
| 63 | NO₂ | H | 5 | 42.40 | 4.96 | 9.22 | 10.46 | (1) |
| 64 | H | NO₂ | 5 | 42.47 | 4.97 | 9.81 | 10.36 | (1) |
| 65 | H | H | 6 | 51.51 | 6.49 | 5.17 | 11.39 | 3,(4) |
| 66 | H | F | 6 | 48.50 | 5.82 | 4.51 | 10.87 | 1,(4) |
| 67 | F | H | 6 | 48.57 | 5.82 | 4.45 | 11.02 | 1,(4) |
| 68 | Cl | H | 6 | 46.12 | 5.19 | 4.41 | 9.98 | 3,(4) |
| 69 | H | Cl | 6 | 45.64 | 5.25 | 4.42 | 10.17 | 1,(4) |
| 70 | Br | H | 6 | 40.01 | 4.58 | 4.05 | 9.10 | 3,(4) |
| 71 | H | Br | 6 | 40.39 | 4.55 | 3.71 | 9.23 | 3,(4) |
| 72 | I | H | 6 | 35.79 | 4.06 | 3.50 | 7.78 | 1,(4) |
| 73 | H | I | 6 | 35.32 | 4.06 | 3.45 | 7.90 | 1,(4) |
| 74 | CH₃ | H | 6 | 48.97 | 6.73 | 4.97 | 10.82 | 1,(4) |
| 75 | H | CH₃ | 6 | 49.04 | 6.98 | 4.86 | 10.65 | 1,(4) |
| 76 | OCH₃ | H | 6 | 46.86 | 6.33 | 4.56 | 10.21 | 1,(4) |
| 77 | H | OCH₃ | 6 | 46.40 | 6.41 | 4.82 | 10.41 | 1,(4) |
| 78 | NO₂ | H | 6 | 44.31 | 5.43 | 8.88 | 9.76 | 1,(4) |
| 79 | H | NO₂ | 6 | 44.68 | 5.13 | 8.77 | 9.65 | 1,(4) |
| 80 | H | H | 7 | 53.43 | 7.16 | 4.62 | 11.18 | 1,3,(4) |
| 81 | H | F | 7 | 49.87 | 5.90 | 4.59 | 10.08 | (4) |
| 82 | F | H | 7 | 49.94 | 6.23 | 4.25 | 10.53 | (4) |
| 83 | Cl | H | 7 | 47.81 | 5.57 | 4.22 | 9.54 | 1,(4) |
| 84 | H | Cl | 7 | 47.93 | 5.63 | 4.21 | 9.72 | 1,(4) |
| 85 | Br | H | 7 | 41.71 | 4.95 | 3.91 | 8.46 | (4) |
| 86 | H | Br | 7 | 41.80 | 5.20 | 3.86 | 8.58 | (4) |
| 87 | I | H | 7 | 37.22 | 4.69 | 3.03 | 7.80 | (1),4 |
| 88 | H | I | 7 | 37.29 | 4.70 | 3.34 | 7.65 | (1) |
| 89 | CH₃ | H | 7 | 50.63 | 7.07 | 4.75 | 10.32 | (1) |
| 90 | H | CH₃ | 7 | 50.75 | 7.37 | 4.40 | 10.50 | (1) |
| 91 | OCH₃ | H | 7 | 48.31 | 7.02 | 4.12 | 10.13 | (1)4 |
| 92 | H | OCH₃ | 7 | 48.39 | 7.04 | 4.32 | 9.66 | (1) |
| 93 | NO₂ | H | 7 | 46.31 | 5.80 | 8.51 | 9.65 | (1) |
| 94 | H | NO₂ | 7 | 46.08 | 5.80 | 8.10 | 9.53 | (1),4 |
| 95 | H | H | 8 | 55.00 | 7.00 | 4.55 | 10.18 | 1,(4) |
| 96 | H | F | 8 | 51.50 | 6.35 | 4.49 | 9.73 | 1,(4) |
| 97 | F | H | 8 | 51.58 | 6.37 | 4.45 | 9.88 | 1,(4) |
| 98 | Cl | H | 8 | 49.16 | 6.31 | 3.83 | 9.59 | 3,(4) |
| 99 | H | Cl | 8 | 49.29 | 6.37 | 3.84 | 9.12 | 3,(4) |
| 100 | Br | H | 8 | 43.69 | 5.38 | 3.87 | 8.24 | 3,(4) |
| 101 | H | Br | 8 | 43.48 | 5.63 | 3.82 | 8.37 | 3,(4) |
| 102 | I | H | 8 | 38.88 | 5.10 | 3.07 | 7.65 | (4) |
| 103 | H | I | 8 | 38.95 | 5.11 | 3.03 | 7.19 | (4) |
| 104 | CH₃ | H | 8 | 52.54 | 7.77 | 4.34 | 10.25 | (4) |
| 105 | H | CH₃ | 8 | 52.31 | 7.72 | 4.23 | 10.08 | (4) |
| 106 | OCH₃ | H | 8 | 49.90 | 7.37 | 4.04 | 9.21 | 3,(4) |
| 107 | H | OCH₃ | 8 | 50.03 | 7.45 | 4.23 | 9.34 | 3,(4) |
| 108 | NO₂ | H | 8 | 47.68 | 6.24 | 7.68 | 9.36 | (4) |
| 109 | H | NO₂ | 8 | 47.75 | 6.24 | 7.87 | 9.02 | (4) |
| 110 | H | H | 9 | 56.10 | 7.66 | 4.22 | 10.19 | (1),3 |
| 111 | H | F | 9 | 53.37 | 6.54 | 4.18 | 9.19 | (1),4 |
| 112 | F | H | 9 | 53.13 | 6.84 | 4.42 | 9.61 | (1) |
| 113 | Cl | H | 9 | 50.74 | 6.78 | 3.82 | 8.78 | (1) |
| 114 | H | Cl | 9 | 50.89 | 6.26 | 3.84 | 8.91 | (1) |
| 115 | Br | H | 9 | 44.73 | 5.84 | 3.29 | 8.09 | (1) |
| 116 | H | Br | 9 | 45.10 | 6.09 | 3.23 | 8.22 | (1) |
| 117 | I | H | 9 | 40.21 | 5.26 | 3.43 | 7.28 | (1),3 |
| 118 | H | I | 9 | 40.28 | 5.27 | 3.08 | 7.11 | (1),4 |
| 119 | CH₃ | H | 9 | 53.48 | 7.61 | 4.31 | 9.39 | (1) |
| 120 | H | CH₃ | 9 | 53.87 | 7.57 | 4.21 | 9.83 | (1) |
| 121 | OCH₃ | H | 9 | 51.49 | 7.22 | 4.03 | 8.98 | (1),4 |
| 122 | H | OCH₃ | 9 | 51.01 | 7.29 | 4.22 | 9.11 | (1),4 |
| 123 | NO₂ | H | 9 | 49.00 | 7.84 | 7.84 | 8.88 | (1) |
| 124 | H | NO₂ | 9 | 49.06 | 7.42 | 7.42 | 8.82 | (1) |
| 125 | H | H | 10 | 57.17 | 7.78 | 4.30 | 9.44 | (4) |
| 126 | H | F | 10 | 54.32 | 7.10 | 3.68 | 9.13 | (4) |
| 127 | F | H | 10 | 54.44 | 7.16 | 3.67 | 9.26 | (4) |
| 128 | Cl | H | 10 | 52.09 | 6.81 | 4.01 | 8.70 | (4) |
| 129 | H | Cl | 10 | 51.88 | 6.82 | 3.95 | 8.83 | (3) |
| 130 | Br | H | 10 | 46.42 | 6.15 | 3.19 | 7.84 | (3) |
| 131 | H | Br | 10 | 46.49 | 5.80 | 3.15 | 7.99 | (3) |
| 132 | I | H | 10 | 41.85 | 5.20 | 3.00 | 6.73 | (3) |
| 133 | H | I | 10 | 41.64 | 5. | 3.26 | 7.17 | (3) |
| 134 | CH₃ | H | 10 | 55.05 | 8.15 | 3.88 | 9.34 | (3) |
| 135 | H | CH₃ | 10 | 55.17 | 7.85 | 4.07 | 9.47 | (3) |
| 136 | OCH₃ | H | 10 | 52.84 | 7.53 | 3.85 | 8.61 | (3) |
| 137 | H | OCH₃ | 10 | 52.31 | 7.53 | 4.04 | 8.79 | (3) |
| 138 | NO₂ | H | 10 | 50.36 | 6.74 | 7.57 | 8.57 | (3) |
| 139 | H | NO₂ | 10 | 50.75 | 6.46 | 7.48 | 8.18 | (3) |
| 140 | H | H | 11 | 58.15 | 7.89 | 3.98 | 8.91 | 1,(3) |
| 141 | H | F | 11 | 55.37 | 7.24 | 3.98 | 8.39 | 1,(3) |
| 142 | F | H | 11 | 55.44 | 7.55 | 3.63 | 9.02 | 1,(3) |
| 143 | Cl | H | 11 | 53.43 | 6.88 | 3.66 | 8.17 | 1,(3) |
| 144 | H | Cl | 11 | 52.97 | 6.96 | 3.67 | 8.37 | 1,(3) |
| 145 | Br | H | 11 | 47.52 | 6.53 | 3.19 | 7.69 | 1,(3) |
| 146 | H | Br | 11 | 47.88 | 6.18 | 3.13 | 7.22 | 1,(3) |
| 147 | I | H | 11 | 43.01 | 5.93 | 2.77 | 6.99 | (3),4 |
| 148 | H | I | 11 | 43.08 | 5.94 | 3.01 | 6.81 | (3) |
| 149 | CH₃ | H | 11 | 56.07 | 8.24 | 4.11 | 8.77 | (3) |
| 150 | H | CH₃ | 11 | 56.46 | 8.21 | 4.02 | 8.62 | (3) |
| 151 | OCH₃ | H | 11 | 53.56 | 7.86 | 3.80 | 8.43 | (3) |
| 152 | H | OCH₃ | 11 | 53.67 | 7.92 | 3.44 | 8.56 | (3) |
| 153 | NO₂ | H | 11 | 51.72 | 7.12 | 6.82 | 8.38 | (3),4 |
| 154 | H | NO₂ | 11 | 51.78 | 7.13 | 7.01 | 8.32 | (3),4 |
| 155 | H | H | 12 | 59.30 | 8.23 | 3.92 | 8.64 | 1,(3),4 |
| 156 | H | F | 12 | 56.56 | 7.58 | 3.93 | 8.25 | (3) |
| 157 | F | H | 12 | 56.53 | 7.48 | 3.77 | 8.38 | (3) |
| 158 | Cl | H | 12 | 54.42 | 7.59 | 3.38 | 8.33 | 1,(3) |
| 159 | H | Cl | 12 | 54.49 | 7.59 | 3.38 | 8.16 | 1,(3) |

TABLE 1-continued

Examples 5 to 169

| Example | $R_2$ | $R_4$ | n | C | H | N | S | Method |
|---|---|---|---|---|---|---|---|---|
| 160 | Br | H | 12 | 48.80 | 6.56 | 3.46 | 7.23 | 1,(3) |
| 161 | H | Br | 12 | 48.86 | 6.88 | 2.88 | 7.44 | 1,(3) |
| 162 | I | H | 12 | 44.31 | 6.26 | 2.76 | 6.27 | (3) |
| 163 | H | I | 12 | 44.08 | 5.96 | 3.01 | 6.69 | (3) |
| 164 | $CH_3$ | H | 12 | 57.24 | 8.54 | 3.82 | 8.30 | (3) |
| 165 | H | $CH_3$ | 12 | 57.08 | 8.56 | 4.01 | 8.42 | (3) |
| 166 | $OCH_3$ | H | 12 | 55.14 | 7.94 | 3.52 | 7.93 | (3) |
| 167 | H | $OCH_3$ | 12 | 55.21 | 7.95 | 3.41 | 8.35 | (3) |
| 168 | $NO_2$ | H | 12 | 52.96 | 7.45 | 6.65 | 7.58 | (3) |
| 169 | H | NO | 12 | 53.04 | 6.88 | 6.86 | 8.08 | (3) |

EXAMPLE 170

6-Anilino-1-hexanesulfonic acid tetrabutylammonium salt: 6-Anilino 1-hexanesulfonic acid sodium salt (11.2 g, 0.5 mol) is dissolved in aqueous 0.5M $HClO_4$ solution (30 mL) and acetonitrile (400 mL) is added to the solution. The solution is filtered and the filtrate is kept in a refrigerator overnight to obtain 6-anilino-1-hexanesulfonic acid as a precipitate.

The acid is dissolved in water, neutralized by aqueous tetrabutylammonium hydroxide solution, and then concentrated under reduced pressure to give a white solid.

The solids are recrystallized in methanol-chloroform to obtain 6-anilino-1-hexanesulfonic acid tetrabutylammonium salt (18.4 g, 92%) as a white crystal.

Calcd. for $C_{28}H_{54}N_2O_3S$, C:67.47, H:10.84, N:5.62, S:6.43 Found C:67.25, H:10.82, N:5.55, S:6.51

By the same method as example 170, potassium salt, lithium salt, ammonium salt, tetramethylammonium salt, or tetraethylammonium salt of 6-anilino-1-hexanesulfonic acid can be obtained by the neutralization of 6-anilino-1-hexanesulfonic acid with potassium hydroxide, lithium hydroxide, ammonium hydroxide, tetramethylammonium hydroxide, and tetraethylammonium hydroxide respectively instead of tetrabutylammonium hydroxide.

Other salts of ω-anilino-1-alkanesulfonates (formula (I)) wherein X is potassium, lithium, ammonium, tetramethylammonium, tetraethylammonium, or tetrabutylammonium can be obtained by the same method as Example 170.

Other salts of ω-anilino-1-alkanesulfonates (formula (i)) which are prepared by the same method as in Example 2 and in which $R_1$ is —$(CH_2)_3$— or —$(CH_2)_4$— can be directly obtained by neutralizing corresponding sulfonic acids with potassium hydroxide, lithium hydroxide, ammonium hydroxide, tetramethylammonium hydroxide, tetraethylammonium hydroxide, or tetrabutylammonium hydroxide instead of sodium hydroxide in Example 2.

EXAMPLE 171

8-Anilino-1-octanesulfonic acid anilinium salt: 8-Anilino- 1-octanesulfonic acid sodium salt (10.0 g, 0.5 mol) is dissolved in aqueous 0.5M HCl solution (30 mL) and acetonitrile (400 mL) is added to the solution. The solution is filtered and the filtrate is kept in a refrigerator overnight to obtain 8-anilino- 1-octanesulfonic acid as white precipitates. The precipitates are collected by filtration, dissolved in water, neutralized by aniline, and then concentrated under reduced pressure to give a white solid.

The solids are recrystallized in methanol-chloroform to obtain 8-anilino-1-octanesulfonic acid anilinium salt (10.5 g, 92%) as a white crystal.

Calcd. for $C_{20}H_{30}N_2O_3S$, C:63.77, H:7.94, N:7.40, S:8.49 Found C:63.23, H:8.10, N:7.77, S:8.45

Using aromatic amines of formula (IV) instead of aniline, aromatic ammonium (formula (III)) salts of 1,8-anilino-1-octanesulfonic acids are prepared by the same method as in Example 171.

EXAMPLE 172

In a 300 mL glass rector, 10 g (0.017 mol) of 3-anilino-1-propanesulfonic acid is dissolved in 150 mL of aqueous 1M hydrochloric acid and then 10.6 g (0.017 mol) of ammonium persulfate in 50 mL of water is dropped into the reaction mixture slowly for 2 hr. The reaction mixture is stirred for 3 hr. at room temperature after the addition is over.

After the stirring, the reaction mixture is concentrated to half in volume by distillation under reduced pressure followed by dialysis to remove the low molecular weight compounds. After the complete evaporation of solvent, a black polymeric solid is isolated, which is dissolved in 70 mL of water and 15 g of sulfuric acid and then dialyzed. The above dialysis step is repeated three times and the resulting polymer is neutralized with aqueous tetrabutylammonium hydroxide followed by evaporation of solvent to obtain of tetrabutylammonium poly(3-anilino-1-propanesulfonate) (18.6 g, 87% yield) as a black polymeric film on the wall of the reaction flask. The conductivity of the film is measured by a 4-probe method to be 0.5 S/cm.

EXAMPLE 173

A conductive high copolymer is obtained under the same procedure as in Example 172 except that 2.16 g (0.24 mol) of aniline is used additionally in the initial reaction mixture.

The conductivity of this polymeric film is measured to be 0.64 S/cm.

EXAMPLE 174

In a 300 mL glass reactor, 5 g (0,017 mol) of 6-(2-chloroanilino)- 1-hexanesulfonic acid and 13.2 g (0.1 mol) of anilinium chloride are dissolved in 150 mL water and then 26.6 g (0.117 mol) of ammonium persulfate in 100 mL of water is dropped into the reaction mixture slowly for 2 hr. The reaction mixture is stirred for 3 hr. at room temperature after the addition is over. After the stirring, the black precipitate is filtered, washed with water and methanol and dried under reduced pressure to obtain 14.2 g of conductive high copolymer.

The conductivity of the copolymer thus-obtained is measured to be 0.4 S/cm as a pressed pellet.

EXAMPLE 175

A conductive high copolymer is obtained under the same procedure as in Example 172 except that 14.5 g (0.046 mol) of sodium 6-(2-methoxyanilino)-1-hexanesulfonate is used additionally in the initial reaction mixture.

The conductivity of this polymeric film is measured to be 0.11 S/cm.

EXAMPLE 176

In a 300 mL glass rector, 4 g (0. 017 mol) of 5-(2-chloroanilino)- 1-pentanesulfonic acid is dissolved in 100 mL of water and then 3.51 g (0.013 mol) of ferric chloride hexahydrate in 50 mL of water is dropped into the reaction mixture slowly for 30 min. The reaction mixture is stirred for 5 hr. at room temperature after the addition is over. After the stirring, the reaction mixture is concentrated to half by distillation under reduced pressure followed by dialysis to remove the low molecular weight compounds. After the complete drying of solvent, a black polymeric solid is isolated, which is dissolved in 10 mL of water and 8 g of sulfuric acid and then dialyzed. The above dialysis step is repeated three times and the resulting polymer is neutralized with aqueous tetrabutylammonium hydroxide followed by evaporation of solvent to obtain of tetrabutylammonium poly(5 -(2-chloroanilino)-1-pentanesulfonate) (3.7 g) as a black polymeric film on the wall of the reaction flask.

The conductivity of the film is measured by a 4-probe method to be 0.27 S/cm.

EXAMPLE 177

0.02 mol of tetrabutylammonium 6-(2-chloroanilino)-1-hexanesulfonate and 0.05 mol of perchloric acid are dissolved in acetonitrile and placed in a typical three-electrode electrochemical reactor. 2×5 cm of platinum plate is used as working electrode and the Ag/AgCl reference electrode is used. After applying a potential of 1.0 V between the working and reference electrodes for 2 hr., a green-black film is formed on the working electrode. The polymer film is removed from the reaction solution and washed with acetonitrile.

After drying the solvent in a vacuum oven, conductivity is measured by a 4-probe technique to be 5.35 S/cm.

EXAMPLE 178

A conductive high copolymer is obtained under the same procedure as in Example 177 except that 0.02 mol of sodium 4-anilino- 1-butanesulfonate is used additionally in the initial reaction mixture.

The conductivity of this polymeric film is measured to be 9.1 S/cm.

EXAMPLE 179

A conductive high copolymer is obtained under the same procedure as in Example 177 except that 0.04 mol of aniline is used additionally in the initial reaction mixture.

The conductivity of this polymeric film is measured to be 10.0 S/cm.

EXAMPLE 180

0.02 mol of anilinium 4-anilino-1-hexanesulfonate and 0.05 mol of perchloric acid are dissolved in acetonitrile and placed in a typical three-electrode electrochemical reactor. 2×5 cm of platinum plate is used as a working electrode and platinum expanded foil is used as a counter electrode. After applying a current of 0.2 mA/cm² between the working and counter electrodes for 1 hr., a green-black film is formed on the working electrode. The polymer film is removed from the reaction solution and washed with acetonitrile.

After drying the solvent in a vacuum oven, conductivity is measured by a 4-probe technique to be 18 S/cm.

EXAMPLE 181

A conductive high copolymer is obtained under the same procedure as in Example 180 except that 0.02 mol of 3-anilino-1-propanesulfonic acid is used additionally in the initial reaction mixture.

The conductivity of this polymeric film is measured to be 10 S/cm.

EXAMPLE 182

0.02 mol of 8-(3-methylanilino)-1-octanesulfonic acid and 0.05 mol of perchloric acid are dissolved in acetonitrile and placed in a typical three-electrode electrochemical reactor. 2×5 cm of platinum plate is used as a working electrode and the Ag/AgCl reference electrode is used. After applying a cyclic potential of 0.0 to 0.9 V at a sweep rate of 50 mV/sec between the working and reference electrodes for 100 cycles, a green-black film is formed on the working electrode. The polymer film is removed from the reaction solution and washed with acetonitrile.

After drying the solvent in a vacuum oven, conductivity is measured by a 4-probe technique to be 8 S/cm.

EXAMPLE 183

A conductive high copolymer is obtained under the same procedure as in Example 182 except that 0.04 mol of aniline is used additionally in the initial reaction mixture.

The conductivity of this polymeric film is measured to be 15 S/cm.

EXAMPLE 184

A conductive high copolymer is obtained under the same procedure as in Example 182 except that 0.02 mol of 4-anilino-1-butanesulfonic acid is used additionally in the initial reaction mixture.

The conductivity of this polymeric film is measured to be 6 S/cm.

What is claimed is:

1. A conductive high polymer having repeating units of formula (II) and prepared from aniline derivatives of formula (I),

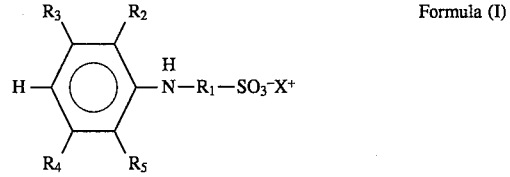

Formula (I)

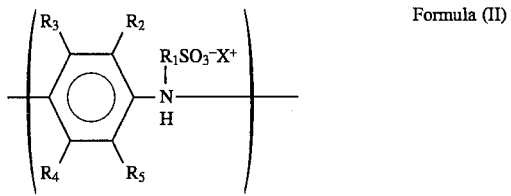

Formula (II)

wherein $R_1$ denotes —$(CH_2)_n$—; n is integer between 2 and 12; $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; and X denotes hydrogen, an alkali metal ion, an ammonium ion, an alkyl ammonium ion selected from the group consisting of tetramethylammonium ion, tetraethylammonium ion and tetrabutylammonium ion, or an anilinium ion.

2. The conductive high polymer in the accordance with claim 1 wherein X is an anilinium ion of formula (III),

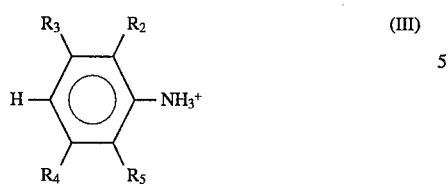

wherein $R_2$, $R_3$, $R_4$ and $R_5$ denote hydrogens or one or two of them can be a halogen atom, methyl, methoxy or nitro groups.

3. A method for preparing a conductive polymer having repeating units of formula (II) by chemical oxidation of aniline derivatives of formula (I) using a chemical oxidant selected from the group consisting of ferric chloride and ammonium persulfate,

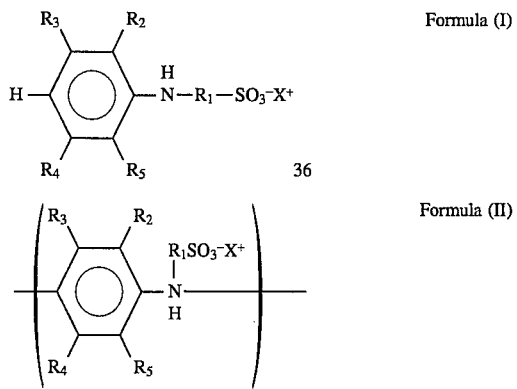

wherein $R_1$ denotes $-(CH_2)_n-$; n is integer between 2 and 12; $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; X denotes hydrogen, an alkali metal ion, an ammonium ion, an alkyl ammonium ion selected from the group consisting of tetramethylammonium ion, tetraethylammonium ion and tetrabutylammonium ion, or an anilinium ion; comprising:

(a) dissolving said chemical oxidant in a solvent or mixture of solvents;

(b) adding to the solution formed in step (a) an ω-anilino-1-alkanesulfonate, to form a conductive high polymer having repeating units of formula (II);

(c) acidifying said conductive high polymer having repeating units of formula (II) with an aqueous solution of hydrochloric, sulfuric or perchloric acid;

(d) dialyzing said acidified, conductive high polymer; and (e) neutralizing said acidified, conductive high polymer with an aqueous base or an aromatic amine of formula (IV)

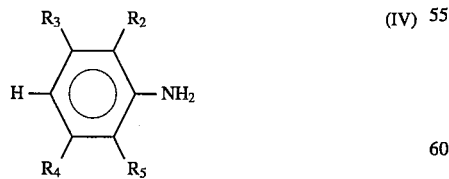

wherein $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom.

4. A method for preparing a conductive polymer having repeating units of formula (II) by electrochemical oxidation of aniline derivatives of formula (I) by applying electrical energy between working and reference electrodes in an electrolytic solution containing aniline derivatives of formula (I), and one or mixed electrolytes of inorganic salts and acidic electrolytes

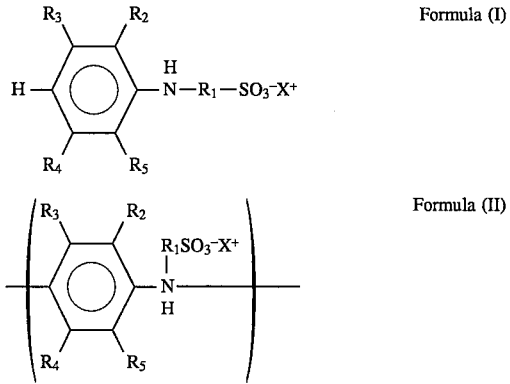

wherein $R_1$ denotes $-(CH_2)_n-$; n is integer between 2 and 12; $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; and X denotes hydrogen, an alkali metal ion, an ammonium ion, an alkyl ammonium ion selected from the group consisting of tetramethylammonium ion, tetraethylammonium ion and tetrabutylammonium ion, or an anilinium ion.

5. The method according to claim 4, wherein said electrical energy is a constant potential of 0.5 to 3.0 V (vs. Ag/AgCl).

6. The method according to claim 4, wherein said electrical energy is a cyclic potential between two limiting potentials chosen from the range of −0.7 to 2.0 V with a scan rate of 10 to 200 mV/sec.

7. The method according to claim 4, wherein said electrical energy is a constant current in the range of 0.01 mA/cm² to 1 A/cm².

8. A conductive copolymer prepared from more than two monomers selected from among the aniline derivatives of formula (I) and aromatic amines of formula (IV) or their ammonium salts,

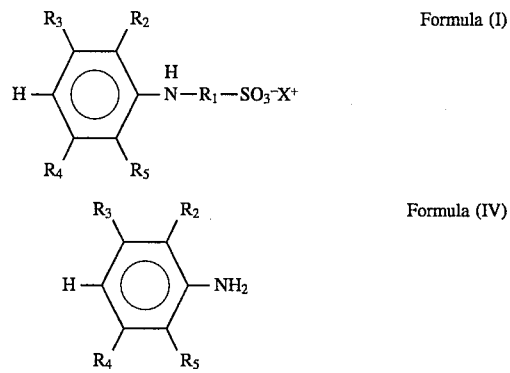

wherein $R_1$ denotes $-(CH_2)_n-$; n is integer between 2 and 12; $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; and X denotes hydrogen, an alkali metal ion, an ammonium ion, an alkyl ammonium ion selected from the group consisting of tetramethylammonium ion, tetraethylammonium ion and tetrabutylammonium ion, or an anilinium ion.

9. A method of preparing a conductive copolymer by chemical oxidation of more than two monomers selected from among the aniline derivatives of formula (I) and aromatic amines of formula (IV) or their ammonium salts by using a chemical oxidant selected from the group consisting of ammonium persulfate and ferric chloride,

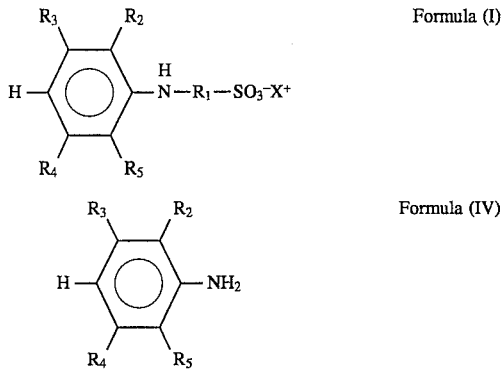

Formula (I)

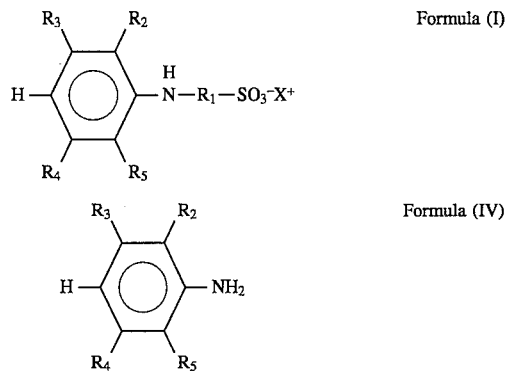

Formula (IV)

wherein $R_1$ denotes —$(CH_2)_n$—; n is integer between 2 and 12; $R_2$, $R_3$, $R_4$ and $R_5$ denote hydrogens, or one of two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; and X denotes hydrogen, an alkali metal ion, an ammonium ion, an alkyl ammonium ion selected from the group consisting of tetramethylammonium ion, tetraethylammonium ion and tetrabutylammonium ion, or an anilinium ion.

10. The method according to claim 9, wherein the conductive copolymer is prepared by electrochemical oxidation of more than two monomers selected from among the aniline derivatives of formula (I) and aromatic amines of formula (IV) or their ammonium salts by applying electrical energy between working and reference electrodes in an electrolytic solution containing the monomers and one or mixed electrolytes of inorganic salts wherein $R_1$ denotes —$(CH_2)_n$—; n is integer between 2 and 12; $R_2$, $R_3$, $R_4$ and $R_5$ denote hydrogens, or one or two of $R_2$, $R_3$, $R_4$ and $R_5$ denote a halogen atom, methyl, methoxy or nitro groups and the remainder of $R_2$, $R_3$, $R_4$ and $R_5$ denote a hydrogen atom; and X denotes hydrogen, an alkali metal ion, an ammonium ion, an alkyl ammonium ion selected from the group consisting of tetramethylammonium ion, tetraethylammonium ion and tetrabutylammonium ion, or an anilinium ion.

11. The method according to claim 10, wherein said electrical energy is a cyclic potential between two limiting potentials chosen from the range of –0.7 to 2.0 V with a scan rate of 10 to 200 mV/sec.

12. The method according to claim 10, wherein said electrical energy is a constant current in the range of 0.01 mA/cm$^2$ to 1 A/cm$^2$.

13. The method according to claim 10, wherein said electrical energy is a constant potential of 0.5 to 3.0 V (vs. Ag/AgCl).

* * * * *